(12) United States Patent
Kim et al.

(10) Patent No.: US 11,618,243 B2
(45) Date of Patent: *Apr. 4, 2023

(54) FILM FOR GLASS LAMINATION, COMPOSITION FOR FILM FOR GLASS LAMINATION, AND LAMINATED GLASS COMPRISING SAME

(71) Applicant: SKC Co., Ltd., Suwon-si (KR)

(72) Inventors: Hyejin Kim, Suwon-si (KR); Kyuhun Kim, Seoul (KR); Sungjin Chung, Seoul (KR)

(73) Assignee: SKC Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,403

(22) Filed: Feb. 4, 2021

(65) Prior Publication Data
US 2021/0154982 A1    May 27, 2021

Related U.S. Application Data

(63) Continuation of application No. PCT/KR2019/002710, filed on Mar. 8, 2019.

(30) Foreign Application Priority Data

Aug. 16, 2018 (KR) ........................ 10-2018-0095768

(51) Int. Cl.
*B32B 27/22* (2006.01)
*B32B 17/10* (2006.01)
(Continued)

(52) U.S. Cl.
CPC .. *B32B 17/10761* (2013.01); *B32B 17/10036* (2013.01); *B32B 27/06* (2013.01);
(Continued)

(58) Field of Classification Search
CPC ...... C08K 5/0016; C08K 5/159; B32B 15/08; B32B 17/10036; B32B 17/10761;
(Continued)

(56) References Cited

U.S. PATENT DOCUMENTS

| 5,002,820 A | 3/1991 | Bolton et al. |
| 5,475,056 A * | 12/1995 | Koesters ............. C09D 127/06 524/89 |

(Continued)

FOREIGN PATENT DOCUMENTS

| CN | 102666421 A | 9/2012 |
| CN | 105658595 A | 6/2016 |

(Continued)

OTHER PUBLICATIONS

International Search Report dated Jul. 5, 2019 in counterpart International Patent Application No. PCT/KR2019/002710 (3 pages in English and 3 pages in Korean).

(Continued)

*Primary Examiner* — Callie E Shosho
*Assistant Examiner* — Krupa Shukla
(74) *Attorney, Agent, or Firm* — NSIP Law

(57) ABSTRACT

A film for laminating glass including: a first surface layer; a second surface layer disposed opposite to the first surface layer; and at least one sound insulating layer disposed between the first surface layer and the second surface layer, wherein the film for laminating glass has a L/F value reduction rate [G_L/F(A,B)] of 0.07/° C. or less at a temperature range of 20 to 35° C.

15 Claims, 2 Drawing Sheets

(51) Int. Cl.
   *B32B 27/06*   (2006.01)
   *B32B 27/30*   (2006.01)
   *C08K 5/159*   (2006.01)

(52) U.S. Cl.
   CPC ............ *B32B 27/22* (2013.01); *B32B 27/306* (2013.01); *C08K 5/159* (2013.01); *B32B 2250/03* (2013.01); *B32B 2250/05* (2013.01); *B32B 2250/40* (2013.01); *B32B 2307/102* (2013.01); *B32B 2307/412* (2013.01); *B32B 2315/08* (2013.01); *B32B 2329/06* (2013.01); *B32B 2605/006* (2013.01); *B32B 2605/08* (2013.01)

(58) Field of Classification Search
   CPC ............ B32B 2250/03; B32B 2250/05; B32B 2250/40; B32B 2307/102; B32B 2307/412; B32B 2315/08; B32B 2329/06; B32B 2605/006; B32B 2605/08; B32B 27/06; B32B 27/08; B32B 27/18; B32B 27/22
   See application file for complete search history.

(56) References Cited

U.S. PATENT DOCUMENTS

2006/0205871 A1* 9/2006 Papenfuhs ................ C08F 8/00
                                                         525/61
2016/0311199 A1* 10/2016 Iwamoto .................. B32B 7/04
2021/0078302 A1* 3/2021 Kim ................. B32B 17/10605

FOREIGN PATENT DOCUMENTS

| | | |
|---|---|---|
| CN | 107108350 A | 8/2017 |
| CN | 107206737 A | 9/2017 |
| CN | 107215052 A | 9/2017 |
| JP | 4-175248 A | 6/1992 |
| JP | 10-36146 A | 2/1998 |
| JP | 2000-280414 A | 10/2000 |
| JP | 3153904 B2 | 4/2001 |
| JP | 3335449 B2 | 10/2002 |
| JP | 4371462 B2 | 11/2009 |
| JP | 4412773 B2 | 2/2010 |
| JP | 4986312 B2 | 7/2012 |
| JP | 2012-214305 A | 11/2012 |
| JP | 5667455 B2 | 2/2015 |
| JP | 2017-96017 A | 6/2017 |
| KR | 2003-0093220 A | 12/2003 |
| KR | 10-2014-0142043 A | 12/2014 |
| KR | 10-2015-0049910 A | 5/2015 |
| KR | 10-2017-0082616 A | 7/2017 |
| KR | 10-2017-0109763 A | 10/2017 |
| KR | 10-2022-0011781 A | 1/2022 |

OTHER PUBLICATIONS

Written Opinion dated Jul. 5, 2019 in counterpart International Patent Application No. PCT/KR2019/002710 (5 pages in Korean).

* cited by examiner

FILM FOR GLASS LAMINATION, COMPOSITION FOR FILM FOR GLASS LAMINATION, AND LAMINATED GLASS COMPRISING SAME

CROSS-REFERENCE TO RELATED APPLICATIONS

Pursuant to 35 USC 120 and 365(c), this application is a continuation of International Application No. PCT/KR2019/002710 filed on Mar. 8, 2019, and claims the benefit under 35 USC 119(a) of Korean Application No. 10-2018-0095768 filed on Aug. 16, 2018, in the Korean Intellectual Property Office, the entire disclosures of which are incorporated herein by reference for all purposes.

BACKGROUND

1. Field

The present disclosure relates to a film for laminating glass of which a degree of degradation of sound insulation performance is alleviated and generation of optical defects is minimized.

2. Description of the Background

Plasticized polyvinyl acetal is used for manufacture of films, which are applied as an interlayer in alight transmission laminate such as a laminated glass (e.g., enhanced glass and safety glass) or a polymer laminate.

Laminated glass refers to transparent laminate manufactured by disposing a polyvinyl butyral sheet between two sheets of glass. Laminated glass is mainly used for providing transparent barriers in handrails in architecture, architectural cladding, windshields of automobiles and so on.

Functions of the laminated glass include preventing penetration through laminated glass (penetration resistance) and absorbing energy caused from impact to minimalize damage or injury of objects or people inside the transparent barriers (impact resistance). In addition, laminated glass should have excellent optical properties applicable to clear glass, and also should have robust resistant properties against environmental degradation such as caused by moisture (optical properties and moisture resistance). The interlayer sheet applied to laminated glass may also give laminated glass additional functionalities such as reducing transmittance of sound noise, ultraviolet (UV) rays, and/or infrared (IR) rays. In addition, sound insulation performance is also required.

In particular, improved sound insulation performance is highly required for films used for glass in automobiles, architecture, and so on. The sound insulation performance can be evaluated by transmission loss depending on variation of frequency. Since a range of 1,000 to 6,000 Hz belong to the range of equal loudness curve, which is very sensitive for human hearing, the sound insulation performance in the above range is more important than in other ranges.

Sound insulation performance can be improved by laminating two or more layers, generally. Though sound insulation performance may be excellent at 20° C., when the temperature is increased or decreased, the sound insulation performance is remarkably degraded such that improvement therefor is required.

RELATED ART REFERENCES

Patent References

Patent Reference 1: Japan Patent Registration No. 4986312.
Patent Reference 2: Japan Patent Registration No. 3335449.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a film for laminating glass includes: a first surface layer; a second surface layer disposed opposite to the first surface layer; and at least one sound insulating layer disposed between the first surface layer and the second surface layer, wherein the film for laminating glass has a L/F value reduction rate [G_L/F(A,B)] of 0.07/° C. or less at a temperature range of 20 to 35° C., and wherein the L/F value reduction rate is calculated according to Equation (1) below:

$$G\_L/F(A, B) = \frac{L/F(A) - L/F(B)}{L/F(A)} \times \frac{1}{B - A} \quad \text{Equation (1)}$$

where the L/F(A) and the L/F(B) are loss factor L/F values of a laminated glass including the film for laminating glass at A (° C.) and B (° C.), respectively, and where A is a minimum temperature (° C.) within the temperature range, and B is a maximum temperature (° C.) within the temperature range.

The L/F value reduction rate [G_L/F(A,B)], where A is 20° C. and B is 35° C., may be 0.040/° C. or less.

The L/F value reduction rate [G_L/F(A,B)], where A is 20° C. and B is 35° C., may be 0.038/° C. or less.

The L/F value reduction rate [G_L/F(A,B)], where A is 20° C. and B is 25° C., may be 0.07/° C. or less.

The L/F value reduction rate [G_L/F(A,B)], where A is 25° C. and B is 30° C., may be 0.06/° C. or less.

The L/F value reduction rate [G_L/F(A,B)], where A is 30° C. and B is 35° C., may be 0.06/° C. or less.

The film for laminating glass may have a difference of 0.23 or less between the L/F(A) and the L/F(B).

The film for laminating glass may have a loss factor L/F value at 30° C. of 0.18 or more.

The sound insulating layer may be a monolayer

The sound insulating layer may include a plasticizer in an amount of 29 to 42 wt % based on a total weight of the sound insulating layer.

The sound insulating layer may include a trioxane-based compound.

The trioxane-based compound may be one or more trioxane-based compound having 1,3,5-trioxane skeleton, a trioxane-based compound having 1,2,4-trioxane skeleton, or a trioxane-based compound having 1,2,3-trioxane skeleton.

The trioxane-based compound may have the structure of Formula 1 below:

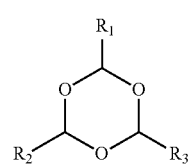

[Formula 1]

In the Formula 1, R1, R2 and R3 are independently hydrogen or alkyl group having 1 to 5 carbon atoms, respectively, with the proviso that at least one of R1, R2 and R3 is not hydrogen.

The trioxane-based compound may be trialkyl trioxane selected from the group consisting of 2,4,6-trimethyl-1,3,5-trioxane, 2,4,6-triethyl-1,3,5-trioxane, 2,4,6-tri(n-propyl)-1,3,5-trioxane, 2,4,6-tri(iso-propyl)-1,3,5-trioxane, 2,4,6-tri(n-butyl)-1,3,5-trioxane, 2,4,6-tri(sec-butyl)-1,3,5-trioxane, 2,4,6-tri(isobutyl)-1,3,5-trioxane, 2,4,6-tri(tert-butyl)-1,3,5-trioxane, 2,4,6-tripentyl-1,3,5-trioxane, and combinations thereof.

The trialkyl trioxane may be tripropyl trioxane selected from the group consisting of 2,4,6-tri(n-propyl)-1,3,5-trioxane, 2,4,6-tri(iso-propyl)-1,3,5-trioxane, and combinations thereof.

The trioxane-based compound may be specifically 2,4,6-tripropyl-1,3,5-trioxane.

The trioxane-based compound may be included in an amount of 0.001 to 10 wt % based on a total weight of the sound insulating layer.

The film for laminating glass may have a loss factor L/F value at 20° C. of 0.32 or more.

The sound insulating layer may have a thickness of 10 to 20% based on a total thickness of the film for laminating glass.

In another general aspect, a laminated glass includes the film for laminating glass disposed between two light transmitting panels.

In another general aspect, a vehicle (an automobile, etc.) may include the laminated glass.

Other features and aspects will be apparent from the following detailed description and the claims.

DETAILED DESCRIPTION

Figure 1A:
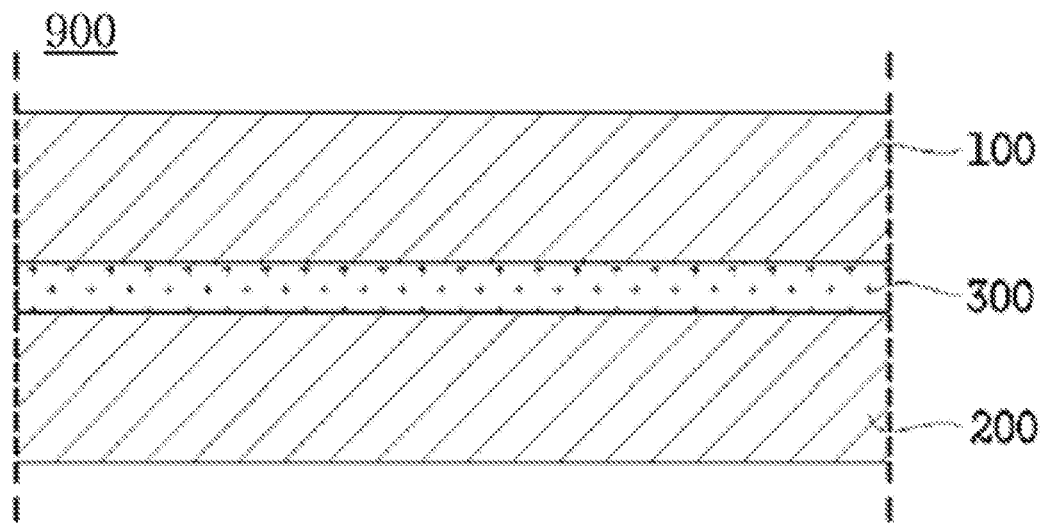
FIG. 1A and FIG. 1B schematically show sections of the film for laminating glass according to one or more examples, respectively.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In the present specification, the term "combination of" included in Markush type description means mixtures or combinations of one or more elements described in Markush type and thereby means that the disclosure includes one or more elements selected from the Markush group.

In the present specification, terms of degree such as "about" and "substantially" are used to mean values approximately equal to a value when a tolerance to be proper to referred meaning for manufacture and substance is presented. Additionally, these terms of degree are used to help understanding of examples and to cover examples that differ insignificantly from an exact or absolute number.

In the present specification, the term "combination of" included in Markush type description means mixtures or combinations of one or more elements described in Markush type and thereby means that the disclosure includes one or more elements selected from the Markush group.

In the present specification, the description of "A and/or B" means "A, or B, or A and B."

In the present specification, the terms such as "first", "second" or "A", "B" are used to distinguish the same terms from each other, unless specifically stated otherwise.

In the present specification, it will be understood that when "B" is referred to as being on "A", "B" can be directly on "A" or intervening other component(s) may be present therebetween. That is, the location of "B" is not construed as being limited to direct contact of "B" with the surface of "A".

In the present specification, the singular forms "a" "an" and "the" are intended to include the plural forms as well, unless context clearly indicates otherwise.

In the present specification, weight average molecule quantity or number average molecule quantity is expressed with omitting Dalton (Da) that is the unit. The weight average molecule quantity and so on are described based on the values measured using GPC (gel permeation chromatography)—ELSD (Evaporative Light Scattering Detector), however the measuring method is not limited thereto.

The film for laminating glass, the composition for the film for laminating glass, and the laminated glass including the same of the present disclosure can provide a film for laminating glass, whose optical properties are excellent, and at the same time, sound insulation performance of the film is excellent at a high temperature (about 35° C.) as well as at room temperature (20° C.). Also, the sound insulation performance is not degraded even at a high temperature, and particularly even at 20 to 25° C. and at 25 to 30° C.

The inventors of the present disclosure found that sound insulation performance of a film for laminating glass is substantially not sufficient in some cases, even though it has good sound insulation performance at a temperature of 20° C., at which a standard test for evaluation of a film for laminating glass conducted. Thus, the inventors understood that it is necessary to compensate the sound insulation performance at a high temperature. As a result, it is discovered that, if a loss factor reduction rate is decreased at 20 to 35° C. while maintaining a sound insulation performance at a certain level, a film for laminating glass can be provided, whose sound insulation performance at a high temperature as well as at a standard temperature is excellent. Also, the inventors of the present disclosure discovered that, along with such excellent sound insulation performance, the film for laminating glass of the present disclosure has excellent optical properties such that optical defects such as distortion are substantially not generated due to an improvement of fluidity of a melt resin.

Figure 1B:
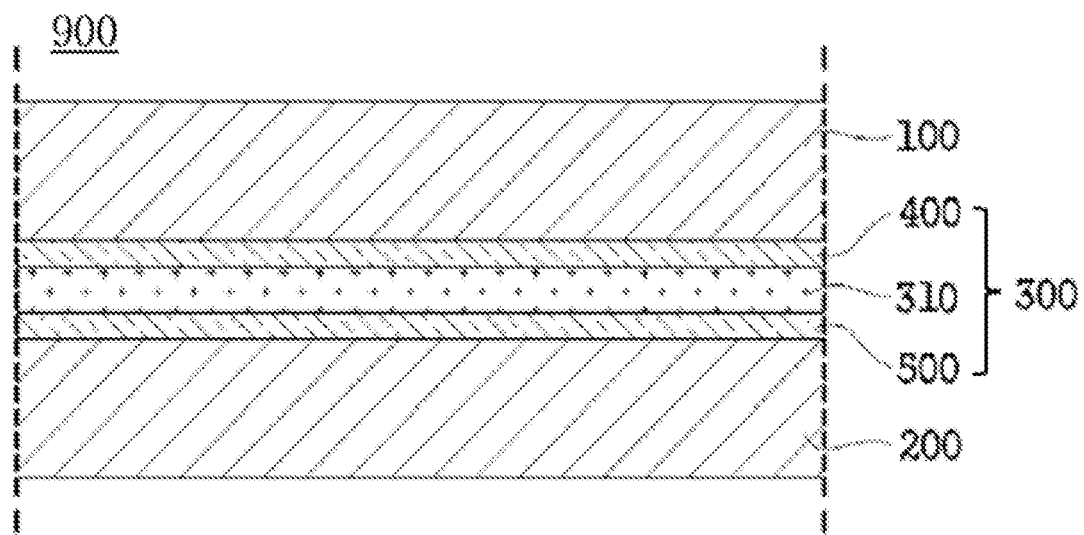

FIG. 1A and FIG. 1B schematically show sections of the film for laminating glass according to one or more examples of the present disclosure, respectively. Referring to FIG. 1, the film for laminating glass 900 according to one or more examples includes: a first surface layer; a second surface layer disposed opposite to the first surface layer; and at least one sound insulating layer disposed between the first surface layer and the second surface layer, wherein the film for laminating glass has a L/F value reduction rate [G_L/F(A, B)] of 0.07/° C. or less at a temperature range of 20 to 35° C., and wherein the L/F value reduction rate is calculated according to Equation (1) below:

$$G\_L/F(A, B) = \frac{L/F(A) - L/F(B)}{L/F(A)} \times \frac{1}{B - A} \qquad \text{Equation (1)}$$

where the L/F(A) and the L/F(B) are loss factor L/F values of a laminated glass including the film for laminating glass at A (° C.) and B (° C.), respectively, and where A is a minimum temperature (° C.) within the temperature range, and B is a maximum temperature (° C.) within the temperature range.

The L/F value reduction rate [G_L/F(A,B)] is a value showing change of a L/F value (loss factor value) depending on temperature change.

The present disclosure provides a film for laminating glass having excellent sound insulation performance at a high temperature as well as at a standard temperature, even with a comparatively thin thickness. This is because the loss factor value of the film for laminating glass according to the present disclosure is rather high at the standard temperature of 20° C., and shows a moderate decrease of the loss factor value as the temperature is increased.

The L/F reduction rate [G_L/F(A,B)] at 20 to 35° C. may be 0.040/° C. or less, or may be 0.038/° C. or less. Specifically, the L/F reduction rate [G_L/F(A,B)] at 20 to 35° C. may be 0.001 to 0.040/° C., or may be 0.01 to 0.038/C.

The L/F value reduction rate [G_L/F(A,B)] at 20° C. to 25° C. may be 0.07/° C. or less, may be 0.065/° C. or less, or may be 0.06/° C. or less. Specifically, the L/F value reduction rate [G_L/F(A,B)] at 20° C. to 25° C. may be 0.001 to 0.065/C, or may be 0.01 to 0.06/C.

The L/F value reduction rate [G_L/F(A,B)] at 25° C. to 30° C. may be 0.06/° C. or less, may be 0.05/° C. or less, or may be 0.04/° C. or less. Specifically, the L/F value reduction rate [G_L/F(A,B)] at 25° C. to 30° C. may be 0.001 to 0.05/C, or may be 0.01 to 0.04/C.

When the film for laminating glass has such a L/F value reduction rate, sound insulation performance thereof is comparatively excellent at 20° C. to 25° C. and 25° C. to 30° C., which are slightly high temperatures compared to the standard temperature, i.e., 20° C.

The film for laminating glass may have a difference of 0.23 or less between the loss factor at 20° C. and the loss factor at 35° C., and the difference may be 0.05 to 0.23, or may be 0.1 to 0.20. When the difference between the loss factor at 20° C. and the loss factor at 35° C. is in such a range, the film for laminating glass can maintain good sound insulation performance even at higher temperatures than the standard temperature, and can have more enhanced and stable sound insulating performance at a medium-high temperature.

The film for laminating glass may have a loss factor at 30° C. of 0.18 or more. The film for laminating glass may have a loss factor at 30° C. of 0.20 or more. The film for laminating glass may have a loss factor at 30° C. of 0.20 to 0.30. When having these values, the film for laminating glass of which sound insulating performance at a high temperature is more excellent can be provided.

The interlayer, i.e., the sound insulating layer may be included in the film for laminating glass as a monolayer. It is advantageous that the present disclosure can achieve the improved sound insulation performance at a high temperature as well as at a standard temperature, using only a single sound insulating layer, but not applying two or more separate sound insulating layers.

The film for laminating glass may have a loss factor value at 20° C. of 0.32 or more, or of 0.35 or more. Such value is evaluated with a film for laminating glass having a thickness of 800 um, substantially, and this means having excellent sound insulation performance at a standard temperature even with a comparatively thin thickness.

A plasticizer may be included in an amount of 29 to 42 wt %, or of 30 to 35 wt % with respect to the entire interlayer, i.e., the sound insulating layer.

The interlayer may include a trioxane-based compound.

The trioxane-based compound functions as an improving agent for sound insulation performance at a high temperature in the film for laminating glass.

The trioxane-based compound may be, for example, one or more types selected from a trioxane-based compound having 1,3,5-trioxane skeleton, a trioxane-based compound having 1,2,4-trioxane skeleton, and a trioxane-based compound having 1,2,3-trioxane skeleton.

For example, the trioxane-based compound may have the 1,3,5-trioxane skeleton and 1 to 3 carbon atoms out of the 3 carbon atoms included in the skeleton may independently have hydrogen or alkyl group having 1 to 5 carbon atoms, respectively, and thus the trioxane-based compound may have the structure of Formula 1 below:

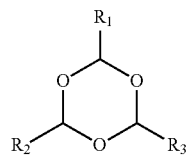

[Formula 1]

In the Formula 1, the R1, R2 and R3 are independently hydrogen or alkyl group having 1 to 5 carbon atoms, respectively.

Specifically, the R1, R2 and R3 are independently hydrogen or alkyl group having 1 to 5 carbon atoms, respectively, with the proviso that at least one of the R1, R2 and R3 is not hydrogen.

The trioxane-based compound may be trialkyl trioxane, and specifically may be selected from the group consisting of 2,4,6-trimethyl-1,3,5-trioxane, 2,4,6-triethyl-1,3,5-trioxane, 2,4,6-tri(n-propyl)-1,3,5-trioxane, 2,4,6-tri(iso-propyl)-1,3,5-trioxane, 2,4,6-tri(n-butyl)-1,3,5-trioxane, 2,4,6-tri(sec-butyl)-1,3,5-trioxane, 2,4,6-tri(isobutyl)-1,3,5-trioxane, 2,4,6-tri(tert-butyl)-1,3,5-trioxane, 2,4,6-tripentyl-1,3,5-trioxane, and combinations thereof.

The trialkyl trioxane may be tripropyl trioxane, and specifically may be selected from the group consisting of 2,4,6-tri(n-propyl)-1,3,5-trioxane, 2,4,6-tri(iso-propyl)-1,3,5-trioxane, and combinations thereof.

The trialkyl trioxane is used in the sound insulating layer of the film for laminating glass such that it improves sound insulation performance when the temperature is increased. Specifically, it maintains a sound insulation performance of the film for laminating glass at a standard temperature in the same degree or more compared to the conventional films, whereas improves the sound insulation performance at a high temperature compared to the conventional films. In addition, an effect of improving fluidity of a molten resin is excellent in a process of manufacturing the film for laminating glass, thereby enabling manufacture of the film for laminating glass having excellent optical performance.

The trioxane-based compound may be included in an amount of 0.001 to 10 wt %, or of 0.001 to 7 wt % with respect to the entire interlayer. When the trioxane-based compound is comprised in the interlayer in such a range of content, sound insulation performance at a high temperature can be further improved.

In addition, the trioxane-based compound may be included in an amount of 0.001 to 4 wt %, or of 0.001 to 2 wt % based on a total weight of the sound insulating layer. In this case, sound insulation performance at a high temperature of the film for laminating glass can be improved, and simultaneously moisture resistance thereof can be improved.

The trioxane-based compound may be included in an amount of 1 wt % or less, of 0.001 to 0.75 wt %, of 0.01 to 0.65 wt %, or of 0.04 to 0.3 wt % based on a total weight of the sound insulating layer. When the trioxane-based compound is included in such an amount, optical properties of the film can be improved, while degradation of moisture resistance is not generated or insignificant in the film overall.

The trioxane-based compound may be specifically 2,4,6-tripropyl-1,3,5-trioxane. The trioxane-based compound functions as an agent for improving fluidity and sound insulation performance at a high temperature, simultaneously, and is effective for enhancing all of sound insulation performance, optical properties, and moisture resistance.

The thickness of the interlayer, i.e., the sound insulating layer may be 10 to 20%, may be 10 to 18%, or may be 11 to 16% based on a total thickness of the film for laminating glass. When the interlayer is formed in such a range, mechanical properties such as penetration resistance and impact resistance can be satisfied simultaneously, with excellent sound insulation performance.

The first surface layer 100 and the second surface layer 200 may contain a polyvinyl acetal, an ionomer, a polyethylene terephthalate, or a polyimide, respectively.

The polyvinyl acetal may be a polyvinyl acetal obtained by acetalization of a polyvinyl alcohol having a degree of polymerization of 1,600 to 3,000 with an aldehyde, or a polyvinyl acetal obtained by acetalization of a polyvinyl alcohol having a degree of polymerization of 1,700 to 2,500 with an aldehyde. When these polyvinyl acetals are applied, mechanical properties like penetration resistance may be enhanced sufficiently.

The polyvinyl acetal may be synthesized using polyvinyl alcohol and aldehyde, but types of the aldehyde are not limited. Specifically, the aldehyde may be one selected from the group consisting of n-butyl aldehyde, isobutyl aldehyde, n-valer aldehyde, 2-ethyl butyl aldehyde, n-hexyl aldehyde and blended resins thereof. When n-butyl aldehyde is used as the aldehyde, manufactured polyvinyl acetal resins may have a refractive index having a small difference from a refractive index of glass, and may have an excellent adhesion quality with glass.

The ionomer may include an olefin repeating unit in an amount of 20 to 95 wt %, 20 to 90 wt %, 40 to 95 wt %, or 40 to 75 wt %. The carboxylic acid repeating unit may be included in an amount of 5 to 80 wt %, 10 to 80 wt %, 5 to 60 wt %, or 25 to 60 wt %.

As a metal ion, a monovalent, divalent or trivalent metal ion may be used. For example, $Na^+$, $K^+$, $Li^+$, $Cs^+$, $Ag^+$, $Hg^+$, $Cu^+$, $Be^{2+}$, $Mg^{2+}$, $Ca^{2+}$, $Sr^{2+}$, $Ba^{2+}$, $Cu^{2+}$, $Cd^{2+}$, $Hg^{2+}$, $Pb^{2+}$, $Fe^{2+}$, $Co^{2+}$, $Ni^{2+}$, $Zn^{2+}$, $Al^{2+}$, $Sc^{3+}$, $Fe^{3+}$, $Al^{3+}$ and $Yt^{3+}$ may be used. Specifically, $Mg^{2+}$, $Na^+$ and $Zn^{2+}$ as the metal ion are preferred.

The ionomer may be a copolymer of an ethylene repeating unit having 2 to 4 carbon atoms and an ethylenic-ally unsaturated carboxylic acid repeating unit having 3 to 6 carbon atoms, and may be an ionic compound including an acidic side chain of 5 mol % or more, in which the acidic side chain can be combined with the metal ion.

The polyethylene terephthalate may be one having a crystallinity of 0% to 80%, of 10% to 70%, or more specifically, of 40% to 60%. The polyethylene terephthalate may be a copolymerization resin, and the copolymerization resin may be copolymerized with an ethylene glycol and a neopentyl glycol as glycol components.

The polyimide may be a resin manufactured by imidization of a polyamic acid derivative obtained from solution polymerization of an aromatic dianhydride and an aromatic diamine or an aromatic diisocyanate. For example, it may be one obtained by imidization of a polyamic acid resin synthesized from an aromatic acid dianhydride including a biphenyltetracarboxylic acid dianhydride and an aromatic diamine including a para-phenylene diamine, but is not limited thereto.

The first surface layer 100 may include a plasticized first polyvinyl acetal.

The first polyvinyl acetal may have hydroxyl group in an amount of 30 mol % or more, and acetyl group in an amount of 5 mol % or less. Specifically, the hydroxyl group may be included in an amount of 30 to 50 mol %, and the acetyl group may be included in an amount of 2 mol % or less. The first polyvinyl acetal resin may have a weight average molecular weight of 200,000 to 300,000. When polyvinyl acetals having these characteristics are applied as the first polyvinyl acetal, a film for laminating glass having excellent adhesion with glass and mechanical strength can be manufactured.

The plasticizer may be selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and mixtures thereof, more specifically may be triethylene glycol bis 2-ethylhexanoate (3G8).

The first surface layer 100 may be formed into a film by melting extruding a composition for the first surface layer comprising a plasticizer and a first polyvinyl acetal, and further comprising other additives described below in a predetermined range.

The second surface layer 200 may include a plasticized second polyvinyl acetal.

The second polyvinyl acetal may have hydroxyl group in an amount of 30 mol % or more, and acetyl group in an amount of 5 mol % or less. Specifically, the hydroxyl group may be included in an amount of 30 to 50 mol %, and the acetyl group may be included in an amount of 2 mol % or less. The first polyvinyl acetal resin may have a weight average molecular weight of 200,000 to 300,000. When polyvinyl acetals having these characteristics are applied as the second polyvinyl acetal, a film for laminating glass having excellent adhesion with glass and mechanical strength can be manufactured.

The second polyvinyl acetal may be the same or different with the first polyvinyl acetal.

The plasticizer of the second surface layer may be the same or different with the plasticizer of the first surface layer. The detailed description about a type of the plasticizer may be the same as described above, and thus further description will be omitted here.

The interlayer 300 as the sound insulating layer may include a plasticized third polyvinyl acetal and the trioxane-based compound.

The interlayer 300 as a sound insulating layer may be a monolayer structure including a plasticized third polyvinyl acetal and the trioxane-based compound.

The interlayer 300 may be a multilayer structure including a first interlayer 310 as a sound insulating layer including a plasticized third polyvinyl acetal and the trioxane-based compound; a second interlayer 400 disposed between the first interlayer 310 and the first surface layer 100 and including a plasticized fourth polyvinyl acetal; and a third interlayer 500 disposed between the first interlayer 310 and the second surface layer 200 and including a plasticized fifth polyvinyl acetal.

The interlayer 300 or the first interlayer 310 functions as a sound insulating layer, may include a trioxane-based compound, and thereby may enhance a sound insulation performance at a high temperature.

The third polyvinyl acetal may have hydroxyl group in an amount of 40 mol % or less, and acetyl group in an amount of 8 mol % or more. The third polyvinyl acetal may have hydroxyl group in an amount of 1 to 30 mol %, and acetyl group in an amount of 1 to 15 mol %. When polyvinyl acetals having these characteristics are applied, a polyvinyl acetal film having sound insulation performance can be manufactured.

The third polyvinyl acetal may have a weight average molecular weight of 490,000 to 850,000, of 610,000 to 820,000, or of 690,000 to 790,000. The third polyvinyl acetal resin may have a weight average molecular weight of 700,000 to 760,000, or of 720,000 to 750,000. In these cases, the improvements in co-extrusion workability and mechanical properties of the manufactured film as described elsewhere herein, may be achieved at the same time.

A difference between the weight average molecular weight of the third polyvinyl acetal resin and the weight average molecular weight of the first polyvinyl acetal resin may be 250,000 to 500,000, may be 300,000 to 500,000, or may be 450,000 to 500,000. When the difference is in the above range, superior properties such as adjustability of extrusion temperature during processes and improved mechanical properties of the manufactured film, may be achieved.

The third polyvinyl acetal resin may have a PDI (polydispersity index) value of 3.5 or less, of 1.2 to 2.5, or of 1.9 to 2.3.

The third polyvinyl acetal resin may have a melt index of 5 to 45 g/10 min in accordance with ASTM D1238 (150° C., 21.6 kg, 37% Kneader). Specifically, the melt index of the third polyvinyl acetal may be 6 to 35 g/10 min, may be 7 to 25 g/10 min, may be 8 to 15 g/10 min, or may be 8.5 to 12.5 g/10 min. When the third polyvinyl acetal resin having such a melt index is applied, process stability may be enhanced.

The third polyvinyl acetal resin may have a viscosity (5% BuOH Sol.) value of 250 to 900 cP, or 500 to 750 cP in accordance with JIS K6728. When the third polyvinyl acetal satisfies this viscosity condition, mechanical properties of the film is enhanced and process efficiency in melting extruding may be improved.

The plasticizer of the interlayer 300 or the first interlayer 310 may be the same or different with the plasticizer used in the first surface layer 100. The detailed description about a type of the plasticizer may be the same as described above, and thus further description will be omitted here.

The amount of the hydroxyl group in the fourth polyvinyl acetal may be between the amount of hydroxyl group in the first polyvinyl acetal and the amount of hydroxyl group in the third polyvinyl acetal. Specifically, the fourth polyvinyl acetal may have hydroxyl group in an amount of 20 to 45 mol %, or of 30 to 45 mol %. When a polyvinyl acetal having such amount of hydroxyl group is used as the fourth polyvinyl acetal, interlayer heterogeneity, which may be generated in the boundary side of the first polyvinyl acetal and the third polyvinyl acetal is alleviated, such that the film for laminating glass having less defects can be manufactured.

The fifth polyvinyl acetal may be one having the characteristics of the fourth polyvinyl acetal. The same polyvinyl acetal as the fourth polyvinyl acetal or a different polyvinyl acetal from the fourth polyvinyl acetal and having above characteristics may be used as the fifth polyvinyl acetal.

The plasticizer in the second interlayer 400 and the third interlayer 500 may be the same plasticizer as the plasticizer in the first surface layer 100 or may be a different from the plasticizer in the first surface layer 100. The detailed description about a type of the plasticizer may be the same as described above, and thus further description will be omitted here.

The amount of the plasticizer included in the first surface layer 100 or the second surface layer 200 may be less than the amount of the plasticizer included in the interlayer 300 or the first interlayer 310.

The difference between the amount of the plasticizer included in the first surface layer 100 or the second surface layer 200 and the amount of the plasticizer included in the interlayer 300 or the first interlayer 310 may be 5 to 18 wt %, may be 5 to 15 wt %, or may be 5 to 10 wt %.

When the difference between the amount of the plasticizer included in the first surface layer 100 or the second surface layer 200 and the amount of the plasticizer included in the interlayer 300 or the first interlayer 310 is in the above range, a film for laminating glass having further excellent optical properties and sound insulation performance can be manufactured.

The first surface layer 100 and the second surface layer 200 may include the plasticizer in an amount of 21 to 29 wt %, respectively, based on a total weight of each layer, and in this case mechanical strength of the film may be further enhanced.

The interlayer 300 and the first interlayer 310 may include the plasticizer in an amount of 29 to 42 wt %, respectively, based on a total weight of each layer, and in this case the interlayer functions as a core layer thereby achieving excellent sound insulation performance in the film.

The second layer 400 and the third layer 500 may include the plasticizer in an amount of 29 to 42 wt %, respectively, based on a total weight of each layer, and in this case heterogeneity between the first surface layer 100 and the second interlayer 400, or heterogeneity between the second surface layer 200 and the third interlayer 500 is alleviated such that a film, in which defects such as bubble generation are decreased, can be manufactured.

The film for laminating glass 900 may have a difference of haze value before and after a moisture resistance test, which is conducted by dipping the film in deionized water at 50° C. for 3 hours. The difference may be within 15%, may be 0 to 15%, or may be 0.1 to 15%. Such a difference means that the excellent optical properties of the film due to comprising the trioxane-based compound are maintained above a certain level even after the moisture resistance test under harsh conditions.

The film for laminating glass 900 may have a haze value of 3% or less, 2.5% or less, or 0.1 to 2%.

The film for laminating glass 900 may further contain an additive selected from the group consisting of an antioxidant, a heat stabilizer, a UV absorber, a UV stabilizer, a glass adhesion regulator, and combinations thereof. The additive may be comprised in at least one layer out of each layer above, and due to inclusion of the additive, long-term durability such as thermal stability and light stability, and anti-scattering performance of the film can be enhanced.

As the antioxidant, a hindered amine-based antioxidant or a hindered phenol-based antioxidant may be used. Specifically, in the process of manufacturing polyvinyl butyral (PVB), which needs a processing temperature of 150° C. or higher, a hindered phenol-based antioxidant may be used. The hindered phenol-based antioxidant, for example, may be Irganox 1976, 1010 or so on manufactured by BASF SE.

As the heat stabilizer, a phosphite-based heat stabilizer may be used considering suitability with an antioxidant. The heat stabilizer, for example, may be Irgafos 168 manufactured by BASF SE.

As the UV absorber, Chemisorb 12, Chemisorb 79, Chemisorb 74, or Chemisorb 102 manufactured by CHEMIPRO KASEI KAISHA, LTD or Tinuvin 328, Tinuvin 329, or Tinuvin 326 manufactured by BASF SE may be used. As the UV stabilizer, Tinuvin manufactured by BASF SE may be used. As the IR absorber, ITO, ATO, and AZO may be used, and as the glass adhesion regulator, a salt of a metal such as magnesium (Mg), potassium (K), sodium (Na), epoxy-based modified silicon (Si) oil, or a mixture thereof may be used, but the present disclosure is not limited thereto.

The film for laminating glass 900 may have a total thickness of 0.4 mm or more, specifically of 0.4 to 1.6 mm, of 0.5 to 1.2 mm, or of 0.6 to 0.9 mm. While mechanical strength or sound insulation performance of the film for laminating glass may be enhanced as the thickness is increased, considering minimum regulation performance, manufacturing cost, and weight reduction, the range of thickness as above is preferable for manufacture of the film satisfying various conditions.

The first surface layer 100 and the second surface layer 200 may independently have a thickness of 0.01 to 0.05 mm, or of 0.02 to 0.04 mm, respectively.

The interlayer 300 may have a thickness of 0.04 to 0.20 mm, of 0.07 to 0.18 mm, or of 0.09 to 0.15 mm.

The second interlayer 400 and the third interlayer 500 included in the film for laminating glass 900 may independently have a thickness of 0.1 mm or less, of 0.09 mm or less, of 0.001 to 0.1 mm, of 0.001 to 0.08 mm, or of 0.001 to 0.3 mm. When the second interlayer 400 and the third interlayer 500 with such a thickness are used, optical defects that may be generated in boundary sides can be minimalized.

The composition for the film for laminating glass according to one or more example embodiments of the present disclosure is a composition for interlayers as a sound insulating layer including a plasticizer, a third polyvinyl acetal, and a trioxane-based compound, wherein the trioxane-based compound is included in an amount of 0.001 to 10 wt % based on a total weight of the composition for interlayers.

The composition for the film for laminating glass is used to manufacture of the film for laminating glass 900.

The film for laminating glass 900 includes a first surface layer 100, a second surface layer 200 opposite to the first surface layer 100, and an interlayer 300 or a first interlayer 310 disposed between the first surface layer 100 and the second surface layer 200. The composition for interlayers described above is used to manufacture the interlayer 300 or the first interlayer 310.

The composition for interlayers may include the third polyvinyl acetal in an amount of 57 to 69 wt %, the plasticizer in an amount of 30 to 42 wt %, and the trioxane-based compound in an amount of 0.001 to 4 wt % based on a total weight of the composition. Specifically, the composition for interlayers may include the third polyvinyl acetal in an amount of 63 to 68 wt %, the plasticizer 31 to 36 wt %, and the trioxane-based compound in an amount of 0.001 to 4 wt %. The composition for interlayers may further include an additional additive described above as needed. The additional additive may be used in an amount of 0.01 to 1 wt %.

The composition for the first surface layer 100 and the composition for the second surface layer 200 may independently include the first polyvinyl acetal or the second polyvinyl acetal in an amount of 66 to 74 wt % and the plasticizer in an amount of 25 to 33 wt % based on a total weight of the composition, respectively. In addition, the additive described above may be included in the compositions in an amount of 0.01 to 1 wt % as needed. In these cases, the surface layers having glass adhesion quality of suitable intensity and excellent mechanical strength can be prepared.

The composition for the second interlayer 400 and the composition for the third interlayer 500 may independently include the fourth polyvinyl acetal or the fifth polyvinyl acetal in an amount of 57 to 72 wt % and the plasticizer in an amount of 27 to 42 wt % based on a total weight of the composition, respectively. In addition, when improvement of fluidity is needed, the compositions may include a trioxane-based compound in an amount of 0.001 to 0.4 wt % and may include the additive described above in an amount of 0.01 to 1 wt % based on a total weight of the composition, respectively, as needed. In these cases, interlayer heterogeneity is alleviated and the second interlayer or the third interlayer, of which optical properties for the film are enhanced, can be manufactured.

The compositions may be manufactured by a method of melting extruding in an extruder, where each composition is put into, laminating through a laminating device such as a feed block, and forming into a film shape on a T-die and so on, for example may be manufactured by co-extrusion.

The method of manufacturing the film for laminating glass according to one or more other example embodiments of the present disclosure includes an extruding step, a laminating step, and a forming step.

The extruding step may be a step of kneading extruding i) a composition for surface layers including a first polyvinyl acetal and ii) a composition for interlayers as a sound insulating layer including a trioxane-based compound of 0.001 to 10 wt %, a plasticizer, and a third polyvinyl acetal, respectively.

As the composition for surface layers, the composition for the first surface layer and the composition for the second surface layer may be selectively used or used together. In this case, the film for laminating glass with three-layers structure described above may be manufactured.

The detailed description about the composition for the first surface layer, the composition for the second surface layer, and the composition for the interlayers may be the same as described above, and thus further description will be omitted here.

The extruding step may further include a process of kneading extruding the composition for the second interlayer and the composition for the third interlayer, selectively or together. In this case, the film for laminating glass with five-layers structure described above may be manufactured.

The laminating step may be a step of laminating a surface layer molten resin containing the extruded composition for the surface layer and an interlayer molten resin containing the composition for the interlayer, wherein the extruded composition for surface layers is laminated to be disposed on and under the extruded composition for the interlayer, thereby manufacturing a laminated molten resin.

In the case of manufacturing the film for laminating glass with five-layers, the laminated molten resin may further include the second interlayer molten resin or the third interlayer molten resin between the surface layer molten resin and the interlayer (the first interlayer) molten resin.

For such laminating, conventional laminating methods may be used, specifically a feed block, a multi manifold and so on, may be used but is not limited thereto.

The forming step is a step of forming the laminated molten resin into a sheet shape and manufacturing the film for laminating glass. Specifically, the forming includes a process of forming the molten resin into a sheet shape and making the film through a T-die and so on.

According to the manufacturing method of the film for laminating glass of the present disclosure, when a multilayer film is manufactured using two or more compositions having different composition and fluidity from each other, particularly the fluidity of the interlayer is improved, thereby the film for laminating glass, of which optical properties such as a distortion are improved, can be provided.

Figure 2:
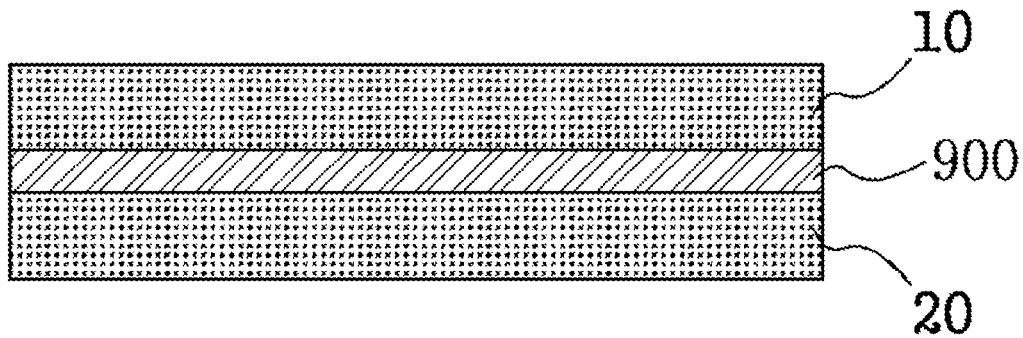
FIG. 2 schematically show a section of the laminated glass according to one or more examples.

FIG. 2 is a drawing schematically showing a section of the film for laminating glass according to one or more examples. Referring to FIG. 2, the laminated glass according to one or more examples of the present disclosure will be described. The laminated glass 950 includes a laminate, in which the film for laminating glass 900 described above is disposed between two sheets of glasses 10, 20.

However, instead of the two sheets of glasses 10, 20, a material of alight transmission panel, such as plastic, transparent metal, and the like is also applicable.

The details about specific structure, composition, characteristics, the manufacturing method of the film for laminating glass 900 may be the same as described above, and thus further description will be omitted here.

Figure 3:
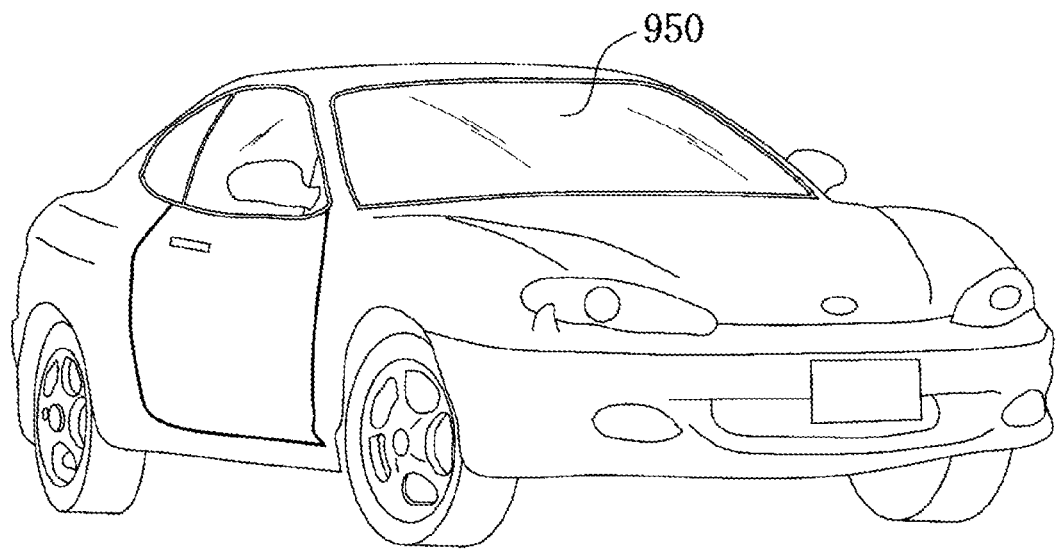
FIG. 3 shows a vehicle according to one or more examples, in which the laminated glass according to one or more examples is applied as a windshield.

FIG. 3 is a drawing showing an example of laminated glass used as a windshield of an automobile, which is an example of a vehicle, according to one or more examples.

Referring to FIG. 3, a vehicle 800 according to one or more examples of the present disclosure will be described. The vehicle 800 includes a laminated glass described above. Specifically, the vehicle 800 includes the laminated glass 950 as a windshield.

The windshield may be installed for shielding external wind from an outside of the vehicle while allowing a driver of the vehicle to observe the outside with naked eyes, and the laminated glass 950 described above may be applied as the windshield.

The vehicle 800 includes a body forming a body of the vehicle, a powertrain attached to the body (engines, etc.), a drive wheel attached to be rotatable to the body, a connector connecting the drive wheel and the powertrain, and a windshield attached to a part of the body of the vehicle. The windshield may be a light transmission laminate shielding the interior of the vehicle from external wind.

The vehicle 800 may be a vehicle with a windshield, for example, the vehicle 800 may be an automobile, and the body, the powertrain, the drive wheel, and the connector may be included without limit as units generally included in an automobile.

The laminated glass 950 may be used as a windshield of an automobile, which is the vehicle 800, and the entire area of the laminated glass 950 may have excellent light transmission performance, impact resistance, and penetration resistance as well as an excellent sound insulation performance at a high temperature.

Hereinafter, one or more example embodiments of the present disclosure will be described in more detail below.

Manufacture of a Film for Laminating Glass

1) Manufacture of a Polyvinyl Acetal Resin

Manufacture of a polyvinyl butyral resin (A): A polyvinyl alcohol resin having an average polymerization degree of 1700 and a saponification degree of 99 was mixed with n-butyl aldehyde, thereby obtaining a polyvinyl butyral resin (A) having butyral group of 54.5 mol % and hydroxyl group of 44.7 mol %.

Manufacture of a polyvinyl butyral resin (B): A polyvinyl alcohol resin having an average polymerization degree of 2400 and a saponification degree of 88 was mixed with n-butyl aldehyde, thereby obtaining a polyvinyl butyral resin (B) having butyral group of 63.1 mol % and hydroxyl group of 18.5 mol %.

2) Manufacture of a Film for Laminating Glass (Manufacture of a film in Example 1) The polyvinyl butyral resin (A) of 73 wt % and 3G8 of 27 wt % as a plasticizer were thrown into a twin screw extruder A and kneaded sufficiently (composition for a film A). The polyvinyl butyral resin (B) of 64 wt %, 3G8 of 34 wt % as a plasticizer, and 2,4,6-tripropyl-1,3,5-trioxane of 1 wt % as an additive were thrown into a twin screw extruder Band kneaded sufficiently (composition for a film B). Co-extrusion thereof was performed with (film A)/(film B)/(film A) structure thereby manufacturing a film in Example 1, wherein the thickness of each layer was 330 μm/120 μm/330 μm and a total thickness was 780 μm (where μm refers to microns) (structure in FIG. 1A).

(Manufacture of a film in Example 2) The polyvinyl butyral resin (A) of 73 wt % and 3G8 of 27 wt % as a plasticizer were thrown into a twin screw extruder A and kneaded sufficiently (composition for a film A). The polyvinyl butyral resin (B) of 64 wt %, 3G8 of 31 wt % as a plasticizer, and 2,4,6-tripropyl-1,3,5-trioxane of 5 wt % as an additive were thrown into a twin screw extruder B and kneaded sufficiently (composition for a film B). Co-extrusion thereof was performed with (film A)/(film B)/(film A) structure thereby manufacturing a film in Example 2, wherein the thickness of each layer was 330 μm/120 μm/330 μm and a total thickness was 780 μm.

(Manufacture of a film in Comparative Example 1) The polyvinyl butyral resin (A) of 73 wt % and 3G8 of 27 wt % as a plasticizer were thrown into a twin screw extruder A and kneaded sufficiently (composition for a film A). The polyvinyl butyral resin (B) of 64 wt % and 3G8 of 36 wt % as a plasticizer were thrown into a twin screw extruder B and kneaded sufficiently (composition for a film B). Co-extrusion thereof was performed with (film A)/(film B)/(film A) structure thereby manufacturing a film in Comparative Example 1, wherein the thickness of each layer was 330 μm/120 μm/330 μm and a total thickness was 780 μm.

Property Evaluation of the Film for Laminating Glass

Optical Defects (Distortion Test)

Manufactured films were cut to length of 10 cm and width of 10 cm, respectively, and inserted between two sheets of clear glass (length of 10 cm, width of 10 cm and thickness of 2.1 cm). Vacuum laminating thereof was performed for 30 seconds in a laminator at 110° C. and under the condition of 1 atmospheric pressure, thereby pre-pressing of the laminated glass was carried out. After pre-pressing, the pre-pressed laminated glass was pressed for 20 minutes in an autoclave at the temperature of 140° C. and under the pressure condition of 1.2 MPa, to obtain the laminated glass.

Obtained samples of the laminated glass were erected with intervals of 10 cm from a wall and illuminated by an LED light from behind 30 cm at an angle of 20 degrees. In their shadows on the wall, distortions as an optical defect were observed and checked. It was evaluated as Fail if any distortion was observed, or evaluated as Pass if no distortion was observed, and the result was shown in Table 1 below.

Bleed Out Test

Manufactured Films were cut to 5 cm×5 cm (width× length) to prepare specimens, and these specimens were treated with heat for 10 minutes in a constant temperature oven heated to 75° C. Thereafter, the specimens were taken out and their surfaces were rubbed with oil paper. When Observed with the naked eye, it was evaluated as Pass if the oil paper was not stained, or evaluated as Fail if the oil paper was stained with something, and the result was shown in Table 1 below.

Penetration Resistance Test

Penetration Resistance was evaluated with the specimens prepared above in accordance with KS L 2007.

Glass with 30 cm×30 cm and a thickness of 2.1 mm was laminated with the films manufactured above, thereby manufacturing a laminate having glass-film-glass structure. It was pre-laminated in vacuum, and degassing and edge sealing thereof were performed. Thereafter, main laminating was carried out at 150° C. for 2 hours using an autoclave to prepare samples for property evaluation. To the samples for property evaluation, a hard ball of 2.27 kg was dropped at about 20° C., and the height, at which the sample was penetrated by the ball, was measured. At this time, it was evaluated as Fail, if the sample was penetrated by the ball in a height under 4 m (meters), or evaluated as Pass, if the sample was penetrated by the ball in a height of 4 m or higher. The results were shown in Table 1.

Impact Resistance Test

Specimens were prepared and impact resistance was evaluated in accordance with KS L 2007:2008.

The specimens for property tests were prepared in the same manner as in the penetration resistance test.

As a low temperature test, a hard ball of 227 g was dropped onto the specimens, which was kept for 4 hours at about minus 20° C., at a height of 9 m, and it was evaluated as Fail, if the specimen, which took impact, was broken and the amount of glass dropped from the specimen upon scattering was 15 g or more, or evaluated as Pass, if the specimen, which took impact, was not broken or the amount of glass dropped from the specimen upon scattering was less than 15 g.

As a room temperature test, a hard ball of 227 g was dropped onto the specimens, which was kept for 4 hour at about 40° C., at a height of 10 m, and it was evaluated as Fail, if the specimen, which took impact, was broken and the amount of glass dropped from the specimen upon scattering was 15 g or more, or evaluated as Pass, if the specimen, which took impact, was not broken or the amount of glass dropped from the specimen upon scattering was less than 15 g.

Evaluation of Sound Insulation Performance (Loss Factor, L/F) at a Basic Temperature and a High Temperature Manufactured films were cut to length of 30 cm and width of 2.5 cm, respectively, and inserted between two sheets of clear glass (length of 30 cm, width of 2.5 cm and thickness of 2.1 cm). Vacuum laminating thereof was performed for 30 seconds in a laminator at 110° C. and under the condition of 1 atmospheric pressure, and thereby pre-pressing of the laminated glass was carried out. After pre-pressing, the pre-pressed laminated glass was pressed for 20 minutes in an autoclave at the temperature of 140° C. and under the pressure condition of 1.2 MPa, to obtain the laminated glass used for measuring sound insulation performance. The manufactured glass samples were kept for 2 weeks in a constant temperature and humidity chamber under the condition of 20° C. and 20 RH % for stabilization, and thereafter sound insulation performance thereof was measured.

Measurement of sound insulation performance was carried out as follows. To the laminated glass vibration was applied by a vibration generator for damp tests, and the vibration characteristics obtained from the laminated glass were amplified by a mechanical impedance measuring device. The spectrum of vibration was analyzed with an FFT spectrum analyzer and then calculated by 1 dB method to obtain L/F (loss factor) value.

A L/F value was measured in a constant temperature and humidity chamber under the condition of 20° C. and 20 RH %, and the measurement of a L/F value was performed while increasing the temperature in 5° C. increments. The measured value was obtained after the temperature of the laminated glass was stabilized, by maintaining at least for 12 hours at the changed temperature. The L/F measured from the stabilized laminated glass is shown in a below table.

TABLE 1

| | The Amount of Trioxane-based Compound in an Interlayer (wt %)* | Optical Defect Distortion | Bleed out | Penetration Resistance | Impact Resistance |
|---|---|---|---|---|---|
| Example 1 | 1 | Pass | Pass | Pass | Pass |
| Example 2 | 5 | Pass | Pass | Pass | Pass |
| Comparative Example 1 | 0 | Fail | Pass | Pass | Pass |

*The amount of 2,4,6-tripropyl-1,3,5-trioxane in an interlayer.

Referring to the result of Table above, it can be confirmed that Example 1 and Example 2 including trioxane-based compound have superior optical properties compared to Comparative Example 1. This is thought to be a result obtained by the trioxane-based compound, which prevents or decrease melt-fractures, which is comparatively sticky and generated during the process of manufacturing the interlayer. In addition, the effect of improving optical properties due to the trioxane-based compound is confirmed as not adversely affecting mechanical properties.

TABLE 2

|  | The Amount (wt %)* | 20° C. L/F | 25° C. L/F | 30° C. L/F | 35° C. L/F | — |
|---|---|---|---|---|---|---|
| Example 1 | 1 | 0.35 | 0.26 | 0.21 | 0.16 | — |
| Example 2 | 5 | 0.35 | 0.31 | 0.26 | 0.21 | — |
| Comparative Example 1 | 0 | 0.35 | 0.22 | 0.15 | 0.10 | — |
|  | At 20 to 25° C. L/F Value Reduction Rate** | At 25 to 30° C. L/F Value Reduction Rate** | At 30 to 35° C. L/F Value Reduction Rate** | At 20 to 35° C. L/F Value Reduction Rate** | At 20 to 30° C. L/F Value Difference*** | At 20 to 35° C. L/F Value Difference*** |
| Example 1 | 0.0514 | 0.0385 | 0.0476 | 0.0362 | 0.14 | 0.19 |
| Example 2 | 0.0229 | 0.0323 | 0.0385 | 0.0267 | 0.09 | 0.14 |
| Comparative Example 1 | 0.0743 | 0.0636 | 0.0667 | 0.0476 | 0.2 | 0.25 |

*The amount of 2,4,6-tripropyl-1,3 5-trioxane in an interlayer.
**The L/F value reduction rate [G_L/F(A, B), unit: °C.$^{-1}$] in a range between A temperature and B temperature is calculated by Equation (1) below. The temperature unit is ° C..

$$G\_L/F(A, B) = \frac{L/F(A) - L/F(B)}{L/F(A)} \times \frac{1}{B - A} \quad \text{Equation (1)}$$

where the L/F(A) and the L/F(B) are loss factor L/F values of a laminated glass including the film for laminating glass at A (° C.) and B (° C.), respectively, and where A is a minimum temperature (° C.) within the temperature range, and B is a maximum temperature (° C.) within the temperature range.

The L/F value difference [D_L/F(A,B)] in a range between A temperature and B temperature is calculated by Equation (2) below. The temperature unit is ° C.

$$D\_L/F(A,B) = L/F(A) - L/F(B) \quad \text{Equation (2):}$$

Referring to the Table 2 above, L/F values at 20° C., which is a standard temperature for evaluation, are same in the three samples. It can be verified that Example 1 and Example 2 including a trioxane-based compound in an interlayer have higher L/F values at 25° C. compared to Comparative Example 1 not including the trioxane-based compound. This means that the degree of decrease of L/F values upon increase of a temperature is comparatively gradual, and this means that examples of the present disclosure have comparatively excellent sound insulation performance at a high temperature as well as at a standard temperature.

In the case of Comparative Example 1, it can be confirmed that a L/F value reduction rate at 20 to 25° C. is considerably large compared to a L/F value reduction rate in other temperature ranges, such that sound insulating performance is lowered significantly at 20 to 25° C. In contrast, in the cases of Example 1 and Example 2, it is shown that sound insulation performance is comparatively well maintained even in the temperature range of 20 to 25° C., because the reduction rate thereof is relatively small. Particularly, Example 1 and Example 2 show considerably low values of the L/F value reduction rate in a temperature range of 25 to 30° C., which is mostly a room temperature, but Comparative Example 1 shows a value of the L/F value reduction rate, which is about 1.5 to 2 times larger than the value of the examples.

The temperature range of 20 to 25° C. or at 25 to 30° C. for L/F value reduction rate is usual indoor temperature range for an automobile, when the laminated glass is utilized as windshields for automobiles. Therefore, the film for laminating glass of the present disclosure has excellent sound insulation performance even at a temperature range for real application as well as at a standard temperature for evaluation.

Accordingly, it is verified that, if a trioxane-based compound, which is an additive of the present disclosure, is used in a certain amount, a film for laminating glass, which prevents distortion as an optical defect and has an enhanced sound insulation performance at a high temperature, can be manufactured.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A film for laminating glass, comprising:

a first surface layer;

a second surface layer disposed opposite to the first surface layer; and at least one sound insulating layer disposed between the first surface layer and the second surface layer, wherein the film for laminating glass has a L/F value reduction rate [G_L/F(A,B)] of 0.07/° C. or less at a temperature range of 20 to 35° C., and wherein the L/F value reduction rate is calculated according to Equation (1) below:

$$G\_L/F(A, B) = \frac{L/F(A) - L/F(B)}{L/F(A)} \times \frac{1}{B - A} \quad \text{Equation (1)}$$

where the L/F(A) and the L/F(B) are loss factor L/F values of a laminated glass comprising the film for laminating glass at A (° C.) and B (° C.), respectively, where A is a minimum temperature (° C.) within the temperature range, and B is a maximum temperature (° C.) within the temperature range, wherein the at least one sound insulating layer comprises a trioxane-based compound, wherein the trioxane-based compound is one or more of a trioxane-based compound having 1,3,5-trioxane skeleton, a trioxane-based compound having 1,2,4-trioxane skeleton, or a trioxane-based compound having 1,2,3-trioxane skeleton, and wherein the trioxane-based compound having 1,3,5-trioxane skeleton has a structure of Formula 1 below;

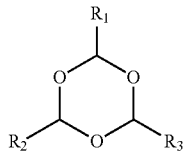

[Formula 1]

where, $R_1$, $R_2$ and $R_3$ are independently hydrogen or alkyl group having 3 to 5 carbon atoms, respectively, with the proviso that at least one of $R_1$, $R_2$ and $R_3$ is not hydrogen.

2. The film for laminating glass of claim 1, wherein the L/F value reduction rate [G_L/F(A,B)], where A is 20° C. and B is 35° C., is 0.040/° C. or less.

3. The film for laminating glass of claim 1, wherein the L/F value reduction rate [G_L/F(A,B)], where A is 25° C. and B is 30° C., is 0.06/° C. or less.

4. The film for laminating glass of claim 1, wherein the L/F value reduction rate [G_L/F(A,B)], where A is 30° C. and B is 35° C., is 0.06/° C. or less.

5. The film for laminating glass of claim 1, wherein the film for laminating glass has a difference of 0.23 or less between the L/F(A) and the L/F(B).

6. The film for laminating glass of claim 1, wherein the film for laminating glass has a loss factor L/F value at 30° C. of 0.18 or more.

7. The film for laminating glass of claim 1, wherein the sound insulating layer is a monolayer.

8. The film for laminating glass of claim 1, wherein the at least one sound insulating layer comprises a plasticizer in an amount of 29 to 42 wt % based on a total weight of the at least one sound insulating layer.

9. The film for laminating glass of claim 1, wherein the trioxane-based compound having 1,3,5-trioxane skeleton is trialkyl trioxane selected from the group consisting of 2,4,6-tri(n-propyl)-1,3,5-trioxane, 2,4,6-tri(iso-propyl)-1,3,5-trioxane, 2,4,6-tri(n-butyl)-1,3,5-trioxane, 2,4,6-tri(sec-butyl)-1,3,5-trioxane, 2,4,6-tri(isobutyl)-1,3,5-trioxane, 2,4,6-tri(tert-butyl)-1,3,5-trioxane, 2,4,6-tripentyl-1,3,5-trioxane, and combinations thereof.

10. The film for laminating glass of claim 9, wherein the trioxane-based compound having 1,3,5-trioxane skeleton is tripropyl trioxane selected from the group consisting of 2,4,6-tri(n-propyl)-1,3,5-trioxane, 2,4,6-tri(iso-propyl)-1,3,5-trioxane, and combinations thereof.

11. The film for laminating glass of claim 1, wherein the trioxane-based compound is comprised in an amount of 0.001 to 10 wt % based on a total weight of the at least one sound insulating layer.

12. The film for laminating glass of claim 1, wherein the film for laminating glass has a loss factor L/F value at 20° C. of 0.32 or more.

13. The film for laminating glass of claim 1, wherein the at least one sound insulating layer has a thickness of 10 to 20% based on a total thickness of the film for laminating glass.

14. A laminated glass comprising a film for laminating glass disposed between two light transmitting panels, wherein the film for laminating glass comprises:
a first surface layer;
a second surface layer disposed opposite to the first surface layer; and
at least one sound insulating layer disposed between the first surface layer and the second surface layer,
wherein the film for laminating glass has a L/F value reduction rate [G_L/F(A,B)] of 0.07/° C. or less at a temperature range of 20 to 35° C., and
wherein the L/F value reduction rate is calculated according to Equation (1) below:

$$G\_L/F(A, B) = \frac{L/F(A) - L/F(B)}{L/F(A)} \times \frac{1}{B - A} \quad \text{Equation (1)}$$

where the L/F(A) and the L/F(B) are loss factor L/F values of a laminated glass comprising the film for laminating glass at A (° C.) and B (° C.), respectively, where A is a minimum temperature (° C.) within the temperature range, and B is a maximum temperature (° C.) within the temperature range, wherein the at least one sound insulating layer comprises a trioxane-based compound, wherein the trioxane-based compound is one or more of a trioxane-based compound having 1,3,5-trioxane skeleton, a trioxane-based compound having 1,2,4-trioxane skeleton, or a trioxane-based compound having 1,2,3-trioxane skeleton, and wherein the trioxane-based compound having 1,3,5-trioxane skeleton has the structure of Formula 1 below:

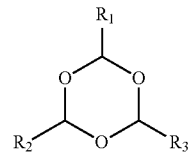

[Formula 1]

where, $R_1$, $R_2$ and $R_3$ are independently hydrogen or alkyl group having 3 to 5 carbon atoms, respectively, with the proviso that at least one of $R_1$, $R_2$ and $R_3$ is not hydrogen.

15. A vehicle comprising a laminated glass comprising a film for laminating glass disposed between two light transmitting panels, wherein the film for laminating glass comprises:

a first surface layer;
a second surface layer disposed opposite to the first surface layer; and
at least one sound insulating layer disposed between the first surface layer and the second surface layer,
wherein the film for laminating glass has a L/F value reduction rate [G_L/F(A,B)] of 0.07/° C. or less at a temperature range of 20 to 35° C., and
wherein the L/F value reduction rate is calculated according to Equation (1) below:

$$G\_L/F(A, B) = \frac{L/F(A) - L/F(B)}{L/F(A)} \times \frac{1}{B - A} \qquad \text{Equation (1)}$$

where the L/F(A) and the L/F(B) are loss factor L/F values of a laminated glass comprising the film for laminating glass at A (° C.) and B (° C.), respectively,
where A is a minimum temperature (° C.) within the temperature range, and B is a maximum temperature (° C.) within the temperature range,
wherein the at least one sound insulating layer comprises a trioxane-based compound,
wherein the trioxane-based compound is one or more of a trioxane-based compound having 1,3,5-trioxane skeleton, a trioxane-based compound having 1,2,4-trioxane skeleton, or a trioxane-based compound having 1,2,3-trioxane skeleton, and
wherein the trioxane-based compound having 1,3,5-trioxane skeleton has the structure of Formula 1 below:

[Formula 1]

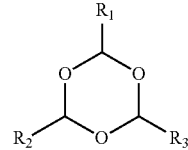

where, $R_1$, $R_2$ and $R_3$ are independently hydrogen or alkyl group having 3 to 5 carbon atoms, respectively, with the proviso that at least one of $R_1$, $R_2$ and $R_3$ is not hydrogen.

* * * * *